(12) United States Patent
Boletis et al.

(10) Patent No.: US 8,881,394 B2
(45) Date of Patent: Nov. 11, 2014

(54) DEVICE FOR REPAIRING THE CASING HOLDER OF AN AERONAUTICAL ENGINE

(75) Inventors: Yannis Boletis, Paris (FR); Alexandre Stephane Thonnard, Paris (FR)

(73) Assignee: SNECMA, Paris (FR)

( * ) Notice: Subject to any disclaimer, the term of this patent is extended or adjusted under 35 U.S.C. 154(b) by 625 days.

(21) Appl. No.: 13/254,113

(22) PCT Filed: Mar. 3, 2010

(86) PCT No.: PCT/EP2010/052644
§ 371 (c)(1),
(2), (4) Date: Aug. 31, 2011

(87) PCT Pub. No.: WO2010/100167
PCT Pub. Date: Sep. 10, 2010

(65) Prior Publication Data
US 2011/0308083 A1    Dec. 22, 2011

(30) Foreign Application Priority Data

Mar. 6, 2009   (FR) ...................................... 09 51425

(51) Int. Cl.
*B23P 6/00* (2006.01)
*F01D 9/02* (2006.01)
*F01D 25/24* (2006.01)

(52) U.S. Cl.
CPC ............ *F01D 25/24* (2013.01); *F05D 2240/14* (2013.01); *F01D 9/02* (2013.01); *Y02T 50/671* (2013.01); *F05D 2230/80* (2013.01); *F05D 2230/20* (2013.01); *B23P 6/002* (2013.01)
USPC .................... 29/889.1; 29/402.99; 29/402.11; 415/213.1

(58) Field of Classification Search
CPC ....... F01D 5/005; F01D 25/24; F01D 25/243; F01D 25/28; F01D 25/285; B23P 6/00; B23P 6/002; B23P 6/005; B23P 2700/01; B23P 6/04; F05B 2230/80
USPC .................... 29/889.1, 90.7, 402.09–402.15; 415/213.1–215.1

See application file for complete search history.

(56) References Cited

U.S. PATENT DOCUMENTS 2,915,930 A  *  12/1959  McKean ........................ 81/53.2
3,155,352 A     11/1964  Batt (Continued)

FOREIGN PATENT DOCUMENTS

| EP | 1 602 442 | 12/2005 |
|----|-----------|---------|
| EP | 1 626 188 | 2/2006 |
| EP | 1591643 B1 * | 7/2007 |

OTHER PUBLICATIONS

International Search Report issued May 6, 2010 in PCT/EP10/052644 filed Mar. 3, 2010.

*Primary Examiner* — David Bryant
*Assistant Examiner* — Jun Yoo
(74) *Attorney, Agent, or Firm* — Oblon, Spivak, McClelland, Maier & Neustadt, L.L.P.

(57) ABSTRACT

A device for repairing a casing holder of an aeronautical engine extending radially relative to the engine rotational axis and including a plurality of lips, each having a hole drilled therein and evenly distributed on the circumference of the holder. The device includes at least one reinforcement holder that can be attached to clean lips of the case holder via through-holes or blind-holes, the reinforcement holder having two orthogonal planes of symmetry. The device further includes a reconditioning holder mounted on the reinforcement holder via a first part using attachment means positioned in one of the planes of symmetry of the reinforcement holder.

12 Claims, 2 Drawing Sheets

(56) References Cited

U.S. PATENT DOCUMENTS

| | | | |
|---|---|---|---|
| 6,561,736 B1* | 5/2003 | Doleshal | 405/251 |
| 7,622,178 B2* | 11/2009 | Bogue et al. | 428/63 |
| 2005/0042092 A1 | 2/2005 | Boegli et al. | |
| 2005/0263220 A1 | 12/2005 | Malley et al. | |
| 2007/0031078 A1 | 2/2007 | Hackett | |
| 2009/0293253 A1* | 12/2009 | Walker | 29/402.13 |

* cited by examiner

DEVICE FOR REPAIRING THE CASING HOLDER OF AN AERONAUTICAL ENGINE

BACKGROUND OF THE INVENTION

1. Field of the Invention

The field of the present invention is that of repairs to aeronautical engines and, more particularly, that of repairs to multi-lip scalloped casing flanges.

2. Description of the Related Art

Aeronautical engines are generally made up of an assembly of modules which are formed, in terms of their external part, by a series of casings aligned one after the other along the axis of rotation of the engine. These casings are assembled by bolts which pass through holes made in flanges which run radially at the longitudinal ends of the casings. These flanges are generally scalloped in order to reduce their mass and keep material only in the region of the assembly holes. They are also used to support the equipment needed for the operation of the engine, which equipment is positioned on the outside of this engine. Equipment supports are thus regularly bolted to the holes made in the flanges.

Because of engine vibrations which excite this equipment and because of the relatively high mass of such equipment, it is found, firstly, that the holes begin to ovalize and secondly that the scallop lips, subjected to fatigue loading, ultimately crack and then even break. This then compromises the retention of the equipment concerned.

Using weld material to build up aluminum-based alloy casings does not restore mechanical properties equivalent to those of the unrepaired component. The repair solutions generally proposed involve leveling of the damaged part and absorbing its loadings through a reinforcing piece which is fastened to the remaining healthy scallop lips situated on each side of the leveled-off lip.

Current repair solutions rely on kits, or sets of components, which are specific and each suited to the repair of a specifically defined design of multi-lip scallop. It therefore follows that the repairer has to have a great many items in stock to suit the various possible types of multi-lipped scallop that need repairing.

Also known is a device for fastening an aeronautical engine accessory to one of its flanges, as described in document U.S. Pat. No. 3,155,352. This involves fastening an accessory to a healthy flange of the engine and provides no teaching as to how to repair a damaged flange.

BRIEF SUMMARY OF THE INVENTION

It is an object of the present invention to address these disadvantages by proposing a repair kit which is easier to use and which, amongst other things, can be mounted on absolutely any face of a flange and can take the place of a damaged scallop lip, whether the latter is on one side of a series of healthy adjacent scallop lips or the other.

To this end, the subject of the invention is a device for repairing an aeronautical engine casing flange running radially with respect to the axis of rotation of the engine and comprising a series of scallop lips, pierced with a hole, uniformly arranged on the circumference of said flange, said device comprising at least one reinforcing flange that can be attached to the healthy scallop lips of said casing flange using through-holes or blind holes, said reinforcing flange having two orthogonal planes of symmetry. It is characterized in that said device further comprises a refurbishment flange mounted, via a first part, on the reinforcing flange using fastening means positioned in one of the planes of symmetry of said reinforcing flange.

The dual symmetry of the reinforcing flange and the fact that the refurbishment flange is installed in one of these planes of symmetry allows for easy positioning, on whichever side of the casing flange and to the right or to the left of the scallop lip that is to be repaired. Advantageously, the through-holes or blind holes are tapped holes. That means that only screw shanks of bolts need be used to attach the reinforcing flange and avoids the unwanted bulk of nuts.

In a preferred embodiment, the reinforcing flange is made of an aluminum alloy and the through-holes or blind holes are bores fitted with tapped steel inserts. It is thus possible to maintain the lightness of an aluminum alloy component, similar to that of the casing flange, while at the same time guaranteeing correct tightening of the bolts into this component.

For preference:
- said fastening means are tapped holes positioned on the external face of said reinforcing flange,
- the first part of the refurbishment flange is inserted in a circumferential cutout made on said external face of the reinforcing flange, so as to reduce the overall height of the device,
- the refurbishment flange is in the form of an L-shaped component made up of a first part running circumferentially in the continuation of the reinforcing flange, and of a second part running radially beyond the end of said first part,
- said second part is axially offset from the plane of symmetry of the first part so as to compensate for the thickness thereof and to lie, following installation on the engine, in the continuation of the casing flange,
- the refurbishment flange is pierced with a hole which, after fitting, is positioned in the place of the hole of the missing scallop lip,
- the refurbishment flange bears a peg which, following installation on the engine, is directed along the axis of the engine and positioned facing the position of the hole of the missing scallop lip,
- the device comprises two refurbishment flanges, mounted at the two ends of the reinforcing flange in the radial plane.

The present application also claims an aeronautical engine module comprising at least one casing flange that has been repaired using a device described hereinabove. It also claims an aeronautical engine comprising at least one module as defined hereinabove.

It finally claims a method of preparing an aeronautical engine casing flange running radially with respect to the axis of rotation of the engine and comprising a series of scallop lips, pierced with a hole, uniformly arranged on the circumference of said flange, at least one scallop lip of which is damaged, comprising the following steps:
- leveling of the damaged scallop lip,
- selecting a free sector on the casing flange, adjacent to the leveled-off scallop lip and which is capable of accepting a reinforcing flange and a refurbishment flange as described hereinabove,
- assembling said reinforcing flange and said refurbishment flange using fastening means,
- fastening said assembly to the casing flange using the holes in the healthy scallop lips of the casing flange and the through-holes or blind holes in the reinforcing flange.

BRIEF DESCRIPTION OF THE SEVERAL VIEWS OF THE DRAWINGS

The invention will be better understood, and other objects, details, features and advantages thereof will become more clearly apparent during the course of the detailed explanatory description that will follow of a number of embodiments of the invention which are given by way of purely illustrative and nonlimiting examples with reference to the schematic attached drawings.

In these drawings.

DETAILED DESCRIPTION OF THE INVENTION

Figure 1:
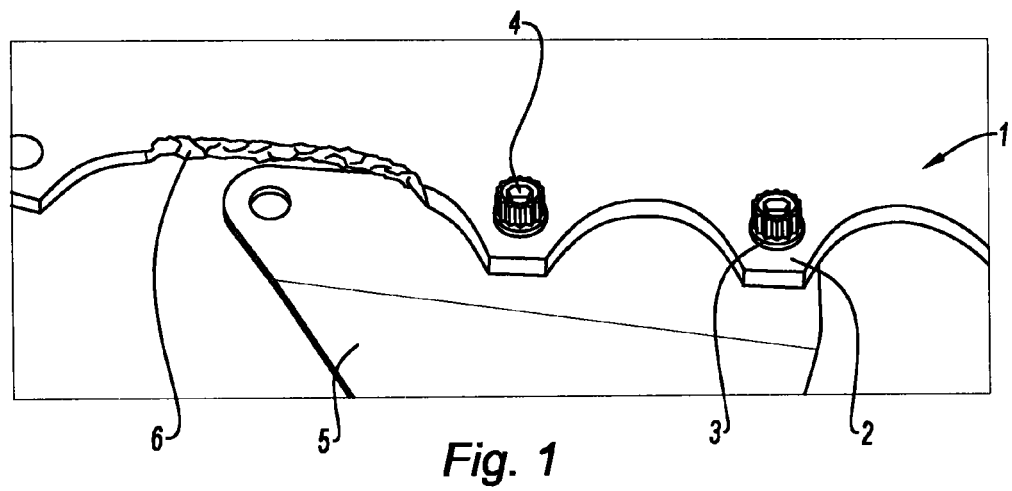
FIG. 1 is a view of a damaged scallop lip.

Reference is made to FIG. 1 which shows a non-structural flange 1 of a casing of a constituent module of an aeronautical engine, running radially with respect to the axis of the engine, the exterior shape of which is in the form of a succession of scallop lips 2 pierced with a hole 3 through which a fastening bolt 4 passes. The purpose of this bolt is to secure the flanges of two adjacent casings to one another and/or to support the support 5 for an engine equipment item. FIG. 1 shows that one scallop lip has been torn out as a result of contact wear (or fretting) caused by a severe vibrational environment.

Figure 2:
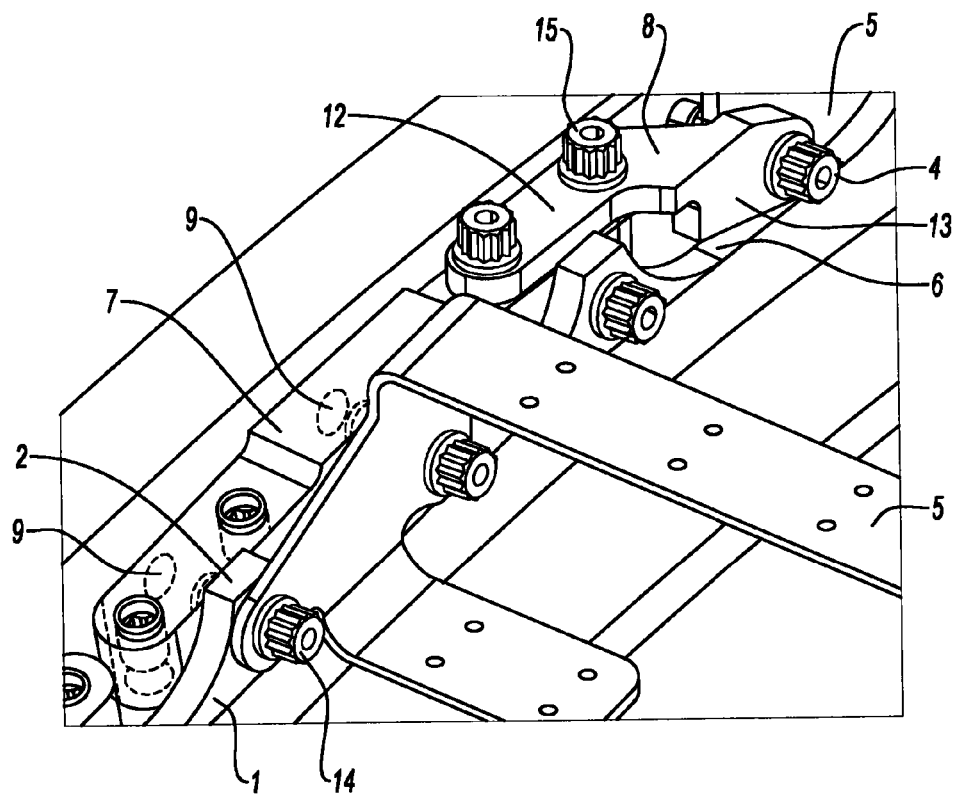
FIGS. 2 and 3 are perspective views of a casing flange on which a repair kit according to one embodiment of the invention is mounted, supporting an equipment support.
Figure 3:
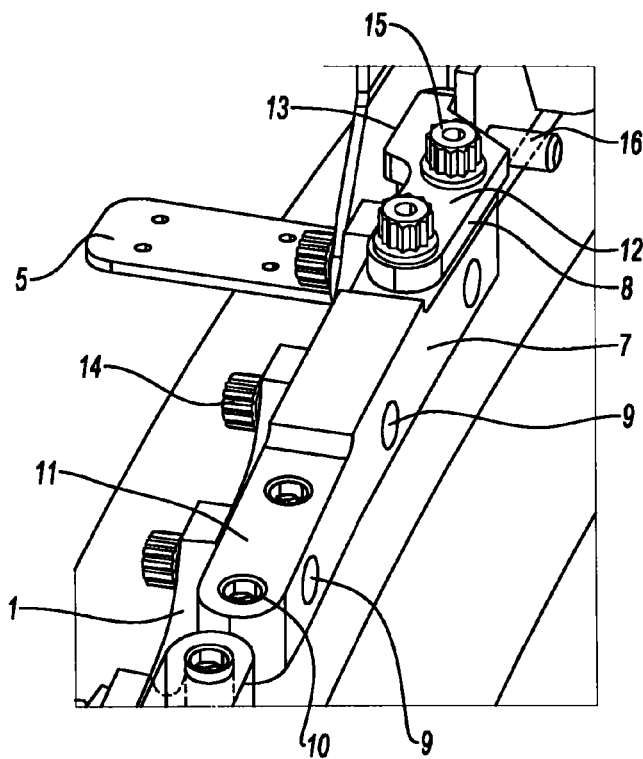

Reference is now made to FIGS. 2 and 3 which show a flange 1 of an engine casing, on which a damaged scallop lip repair kit is mounted. This flange has a damaged scallop lip 6 which has been leveled off in order to remove any uncertainty regarding the integrity of the remaining metal parts and to start out from a known configuration which has been validated from a mechanical standpoint during design of the repair kit. Positioned adjacent to the leveled-off scallop lip 6 are three healthy scallop lips fitted with their fastening bolts 4 for attaching an equipment support 5. Parallel to the flange 1, and fastened to it using the screw shanks of the same bolts 4 of the three healthy scallop lips, the kit comprises a reinforcing flange 7 and a refurbishment flange 8 borne by the reinforcing flange 7.

The reinforcing flange 7 is in the shape of a curved parallelepiped, its curvature mimicking that of the flange 1 to which it is fastened, pierced on its lateral faces with three tapped through-holes 9 in which nutless screw shanks 14 are engaged in place of the bolts 4 used for the healthy scallop lips. Because the casing flange is non-structural, the reinforcing flange is generally made of aluminum alloy for weight saving reasons; the tappings are made in steel inserts fitted into the through-holes 9 so as to withstand the tightening of the screw shanks 14 and offer sufficient resistance to potential unwanted loosening. The through-holes 9 could obviously be replaced by two blind holes aligned with another.

The reinforcing flange 7 has, at each end, on its external face, two tapped holes 10 positioned one beside the other along the flange 1 and which are also fitted with steel inserts in order to withstand the tightening of a screw shank 15 that holds the refurbishment flange 8. The external face of the reinforcing flange 7 may, as illustrated in FIGS. 2 and 3, at each of its ends have a circumferential cutout 11 in order to reduce its radial size and compensate for the bulk added in the form of the refurbishment flange 8.

It is important to note that the reinforcing flange 7 has dual symmetry, with respect to a plane directed radially and passing through the tapped holes 10 and with respect to a plane passing through the axis of rotation of the engine. This dual symmetry allows this reinforcing flange to be used in all conceivable configurations, whether on one side of the damaged flange or the other, and allows a refurbishment flange to be attached to it at either one of its ends. The repairer thus has almost full freedom to choose the positioning of this component and may, in the vast majority of cases, install it irrespective of the configuration and relative positioning of the healthy scallop lips and the leveled-off scallop lips.

The refurbishment flange 8 is in the shape of an L-shaped component made up of a first part 12 positioned on the circumferential cutout 11 of the reinforcing flange 7 and running circumferentially in the continuation of said flange, and of a second part 13 running radially beyond the end of the first part 12. This second part 13 is axially offset from the plane of symmetry of the first part, so as to compensate for the thickness thereof and lie in the continuation of the casing flange 1. The second part is generally pierced with a hole 3 through which there passes a bolt 4, the purpose of this hole being to replace the hole in the leveled-off scallop lip 6.

The refurbishment flange 8 is held on the reinforcing flange by two retaining screws 15 passing through the first part 12 and which engage in the tapped holes 10 made in the external face of the reinforcing flange 7.

It will be noted that in both figures, the reinforcing flange 7 has the same configuration, which means that just one version of it need be manufactured, and it can be used irrespective of the relative arrangement of the leveled-off scallop lip 6 and of the healthy scallop lips and irrespective as to whether it is to be mounted on the upstream or downstream side of the casing flange 1, in relation to the direction in which the gases flow through the engine.

By contrast, there are two versions of refurbishment flange depending on whether the reinforcing flange 7 is positioned on the upstream side or on the downstream side of the casing flange 1. These two versions are symmetric with one another about the plane of symmetry of the first part 12 of the component.

One alternative form of this refurbishment flange is depicted in FIG. 3 where the second part 13 is not pierced with a hole 3 intended to accept a bolt 4 but bears a peg 16 which is intended to collaborate with a hole made in the equipment support 5 that is to be supported.

Figure 4:
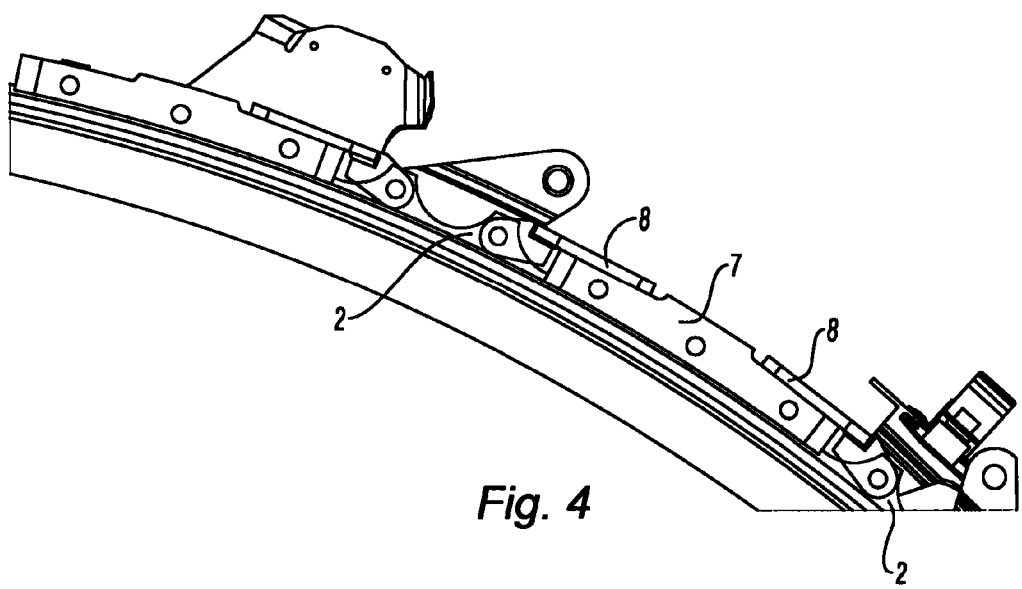
FIG. 4 is a side view of a flange on which two repair kits according to one embodiment of the invention are mounted.

Reference is made to FIG. 4 which shows a highly damaged casing flange which is damaged over a distance corresponding to three scallop lips leveled off between two healthy lips 2. The flange is repaired by fitting a reinforcing flange 7 with three tapped holes 9 and two refurbishment flanges 8, of different versions. A first refurbishment flange is positioned to the right of the reinforcing flange 7 and fastened to the hole 3 of the right-hand healthy scallop lip, while the second refurbishment flange is positioned to the left and fastened to the healthy left-hand scallop lip. FIG. 4 also shows a second repair to the flange using a second reinforcing flange replacing another missing part of the casing flange 1.

The reinforcing flanges 7 depicted in the figures have three tapped through-holes 9 on their lateral faces because this configuration allows most damaged casing flanges to be repaired. Quite obviously, reinforcing flanges with two tapped holes 9 may, for example, be used in instances where the space available along the casing flange 1 is insufficient, provided that the associated mechanical integrity calculations so permit, or alternatively, flanges with more than three tapped through-holes 9 can be used when the number of adjacent leveled-off scallop lips exceeds 3.

The fitting of a repair kit according to the invention on a damaged casing flange will now be described. The damaged part of the scallop lip 2 is first of all leveled off to return to a known starting configuration and healthy situation. This kit comprises a reinforcing flange 7 and a refurbishment flange 8, to be chosen from its two versions according to whether, when viewed from above, its second part 13 is offset to the right or to the left in relation to its first part 12.

If it is just one scallop lip 2 of a damaged casing flange that is being repaired, the operator looks for a free sector on the casing flange, adjacent to the leveled-off scallop lip, which is able to accept a reinforcing flange 7, whether this is on one side of the flange or the other. Because the reinforcing flange 7 has dual planar symmetry, it can be installed whatever side of the flange is chosen. He fastens this reinforcing flange to the casing flange 1, using nutless screws 14, which pass through the holes 3 in the casing flange 1 and engage in the steel thread inserts of the tapped through-holes 9.

Depending on which side he has chosen to fit the reinforcing flange 7 to the casing flange 1 (the so-called right side or the so-called left side with reference to a view of the engine from above, the front of the engine by convention being defined as being to the viewer's left), and depending on how this reinforcing flange is positioned in relation to the leveled-off scallop lip, he selects the appropriate version of refurbishment flange 8. This is a flange, the second part 13 of which is offset to the left if the reinforcing flange is positioned on the right side of the casing flange and is mounted on the right-hand end thereof (when looking at the casing flange) and a flange, the second part 13 of which is offset to the right if mounted on the left-hand end thereof. By contrast, if the reinforcing flange 7 is mounted on the left-hand side of the casing flange 1 then the second part 13 of the refurbishment flange 8 is offset to the right if positioned at its left-hand end and offset to the left if positioned at its right-hand end.

The repairer fixes the refurbishment flange 8 to the reinforcing flange 7 using the retaining screws 15 which engage in the thread inserts made in the tapped holes 10 in the external face of the reinforcing flange. The hole 3, pierced in the second part 13, is then in a position to take over the functions that were previously performed by the hole 3 of the scallop lip that has been leveled off. The equipment supports 5 that were borne by the casing flange 1 and that used the hole in the now leveled-off scallop lip can then be refitted, using the same procedure as in the case of an undamaged flange.

In the instance, illustrated in FIG. 4, in which the reinforcing flange 7 replaces a damaged sector of the casing flange 1, the operator first of all assembles a reinforcing flange 7 with two refurbishment flanges 8 of different types, one of them being offset to the right and the other to the left. The assembly thus formed is fastened to the casing flange 1 using the holes 3 made in the second parts of the two refurbishment flanges 8 and the holes 3 in the two healthy scallop lips adjacent to this repair kit. The side of the casing flange 1 against which the repair kit is positioned is dictated by the fact that, after fitting, one of the faces of the reinforcing flange 7 needs to lie in the continuation of one of the faces of said casing flange 1.

Although the invention has been described in conjunction with a number of particular embodiments, it is quite obvious that it is not in any way restricted thereto and that it comprises all technical equivalents of the means described and combinations thereof where these fall within the scope of the invention.

The invention claimed is:

1. A device for repairing a damaged scallop lip of an aeronautical engine casing flange running radially with respect to an axis of rotation of the engine and including a series of scallop lips, pierced with a hole, uniformly arranged on the circumference of the flange, the device comprising:
at least one reinforcing flange that can be attached to healthy scallop lips of the casing flange using through-holes or blind-holes, the reinforcing flange having two orthogonal planes of symmetry; and
a refurbishment flange including a first part extending circumferentially and positioned on a circumferential outer surface of the reinforcing flange and a second part extending radially inward from an end of the first part, the second part being axially offset from one of the planes of symmetry of the reinforcing flange such that the second part is aligned with the damaged scallop lip which is leveled off,
wherein the refurbishment flange is mounted, via the first part, on the reinforcing flange using fastening means positioned in one of planes of symmetry of the reinforcing flange.

2. The device as claimed in claim 1, wherein the through-holes or blind-holes are tapped holes.

3. The device as claimed in claim 1, wherein the reinforcing flange is made of an aluminum alloy and in which the through-holes or blind-holes are bores fitted with tapped steel inserts.

4. The device as claimed in claim 3, wherein the fastening means includes tapped holes positioned on an external face of the reinforcing flange.

5. The device as claimed in claim 3, wherein the first part of the refurbishment flange is inserted in a circumferential cut-out made on the circumferential outer surface of the reinforcing flange.

6. The device as claimed in claim 3, wherein the refurbishment flange is in a form of an L-shaped component.

7. The device as claimed in claim 3, wherein the refurbishment flange is pierced with a hole which, after fitting, is positioned in place of a hole of a missing scallop lip.

8. The device as claimed in claim 3, wherein the refurbishment flange bears a peg which, following installation on the engine, is directed along the axis of the engine and positioned facing the position of a hole of a missing scallop lip.

9. The device as claimed in claim 1, comprising two refurbishment flanges which are mounted at two ends of the reinforcing flange and situated in the plane in which the fastening means are positioned.

10. An aeronautical engine module comprising at least one casing flange that has been repaired using a device as claimed in claim 1.

11. An aeronautical engine comprising at least one module as claimed in claim 10.

12. A method of preparing an aeronautical engine casing flange running radially with respect to the axis of rotation of the engine and including a series of scallop lips, pierced with a hole, uniformly arranged on the circumference of the flange, at least one scallop lip of which is damaged, the method comprising:
leveling the damaged scallop lip;
selecting a free sector on the casing flange, adjacent to the leveled-off scallop lip and which is capable of accepting a reinforcing flange which is attachable to healthy scallop lips of the casing flange using through-holes or blind holes and having two orthogonal planes of symmetry and a refurbishment flange mounted, via a first part, on the reinforcing flange using fastening means positioned in one of planes of symmetry of the reinforcing flange;
assembling the reinforcing flange and the refurbishment flange using the fastening means; and
fastening the assembly to the casing flange using the holes in healthy scallop lips of the casing flange and the through-holes or blind-holes in the reinforcing flange.

* * * * *